Figure 1:
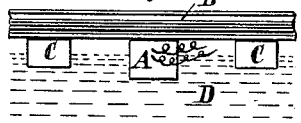
Figure 2:
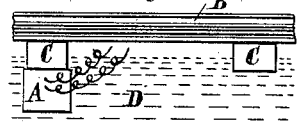

(No Model.)

E. DUMMER.
ELECTRICAL SIGNAL.

No. 288,556. Patented Nov. 13, 1883.

Attest;
John G. W. Romans,
A. C. Barrows.

Inventor;
Edward Dummer.

UNITED STATES PATENT OFFICE.

EDWARD DUMMER, OF BOSTON, MASSACHUSETTS.

ELECTRICAL SIGNAL.

SPECIFICATION forming part of Letters Patent No. 288,556, dated November 13, 1883.

Application filed September 18, 1882. (No model.)

*To all whom it may concern:*

Be it known that I, EDWARD DUMMER, a citizen of the United States, and a resident of Boston, in the county of Suffolk and State of Massachusetts, have invented a new and useful Improvement in Electric Signals, of which the following is a specification, reference being had to the accompanying drawings.

My invention relates to electric signals especially adapted and useful for railways, but also applicable on other roads, or where it is desirable to utilize vibration of the ground for signaling by electricity, having for its object a method of and means for obtaining the requisite motion of magnet, armature, or coil for generating electric impulses or currents according to well-known principles of magneto-electricity, said means including novel devices which may also be employed in an apparatus for making and breaking circuit where a battery or other outside source of electricity is used.

It is of my invention to convert the vibration of any part of a railway, or of the bed of any road, or of the ground, into vibration or motion of any part of a system of magnet, armature, and coil, whereby an electric current or impulse is generated. It also appears that part of the apparatus which is of my invention and to convert said vibration, as stated above—namely, that part which is an inclosed case constructed so that the parts, sides, or walls thereof are rigidly joined together, so as to be vibrated as a whole, or a part or side vibrated as a metallic diaphragm—is useful in a device for making and breaking circuit when a battery is employed. Therefore I make the following somewhat extensive description in order to show how, for various adaptations, the said vibration may be applied for the purpose named, and also how the inclosed case may be adapted in making and breaking circuit. The claims particularly distinguish that which is new and of the one invention.

In the drawings I have shown various ways of adapting my invention.

The figures of the drawings will be described in sufficient detail in connection with the several parts of the explanation of my invention hereinafter fully set forth.

Heretofore in electric railway-signals it has been customary to obtain that motion of mechanism necessary for generating the electric current by means of a lever or other projection, which is struck and moved by a wheel or other part of or a projection from a locomotive or car. Such contrivances are objectionable for many reasons. The lever or other equivalent device and attendant mechanism is more or less exposed to the weather, may be accidentally obstructed, and may be tampered with. A stone or other object may get under the lever, and rust, dirt, and other accumulations fill the joints and bearings, impeding the working parts. The lever or other projection is struck with considerable force when the train is in rapid motion. Such blows are, for obvious reasons, very detrimental, and such devices need constant care and frequent repairs.

Any observing person will notice that when a wheel of locomotive or car passes over any part of a rail that part moves downward to an extent very perceptible, and springs back to its normal position after the wheel passes off. This motion results from the bending of the rail between the sleepers, and is also owing to a slight space between the rail and sleeper and a movement of the sleeper itself. The sleeper springs slightly and settles to a degree, the road-bed thereunder being slightly compressed. There is also a trembling of the road-bed, giving rise to that rumbling sound which may be heard some distance away. I propose to utilize these movements—one, a part, or all of them—to obtain that motion of mechanism required for the purposes named, thus requiring nothing to be moved directly by the locomotive, car, or carriage other than that which is now a part of a railway or road—namely, the rail, sleeper, or road-bed.

Figure 3:
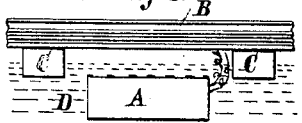
Figure 4:
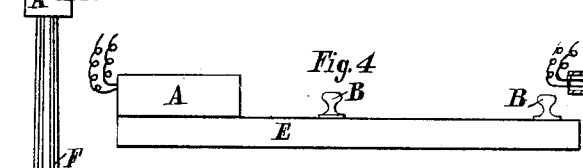
Figure 6:
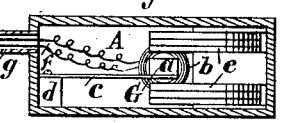
Figure 5:
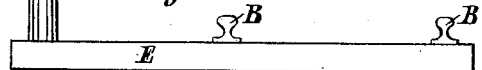
Figure 7:
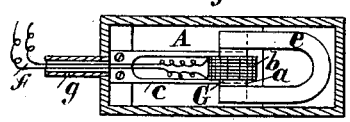
Figure 10:
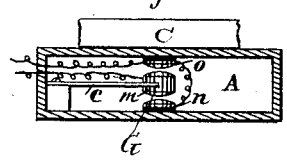
Figure 11:
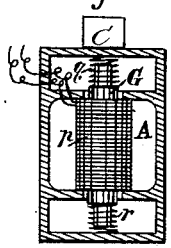

In the drawings, Figures 1, 2, 3, 4, and 5 are intended to illustrate how the device may be located. It may include a closed case, A, placed directly under a rail, B, as shown in Fig. 1, immediately under a sleeper, C, Fig. 2, embedded in the road-bed, D, simply, as shown in Fig. 3, or it may be located directly on the end of an extended sleeper, E, Fig. 4, or on a post, F, erected on such sleeper E, Fig. 5. If the post F were simply set in the ground in or near the road-bed, it would, to a degree, be moved by a passing locomotive, car, or carriage, and this movement might be utilized to operate the device in its most sensitive forms. I prefer to employ a simple closed metallic case, A, having provision for the exit of the wire or wires. The top or one or more sides may be removable for adjusting the parts inclosed therein. In Fig. 6 is shown a vertical section of such a case, and in Fig. 7 a horizontal section of the same. The case shown in Figs. 6 and 7, as also those shown in Figs. 10 and 11, is supposed to have a rigid top and bottom, as well as rigid sides and ends. Such case, placed with reference to the railway or road as specified above, will, on the passing of a locomotive, car, or carriage, be moved or vibrated bodily as if it were a part of rail, sleeper, or road-bed. In the case is placed that which I term a "vibrator," G, which, in Figs. 6 and 7, is an armature, a, having a coil, b. The armature is fastened to a spring, c, which is secured at the other end to a block or stand, d, fixed to the case A. The spring c supports the armature a or magnet a b, having a core of soft iron, in suitable relation to the permanent magnets e, fixed in and to the case A. When the case A is moved in rather rapid vibrations, the vibrator G will have what may be called "counter vibrations" with reference to the case, and the armature or soft core a vibrating to and from the poles or between the opposite poles of the magnets, currents of electricity will be generated in the coil b, which may be conducted by the wires f. These wires may pass into a tube, g, and through this tube to a post or any other suitable support; or insulated wires may simply extend through the side of the case, so as to make a tight joint therewith. One of the wires f may pass directly to ground and through the medium of the case A, if so desired. The case A, as also the tube g, may be so tight as to exclude dirt and water. Thus by being simply placed on, in, or in connection with the rail way or road bed, as specified, its purpose will be gained, and the inclosed mechanism is protected from any injurious blows, accidental or otherwise, and from any obstructions.

Figure 8:
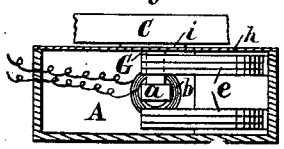

In Fig. 8 is shown a somewhat different arrangement, in which the vibrator G is regarded as consisting, mainly, of a diaphragm, h, to which the armature or soft core a is attached. The diaphragm, preferably metallic, forms the top of the case A, while the bottom, sides, and ends are rigid. The case A is shown in Fig. 8 as located directly under a sleeper, C, there being a thin plate, i, between the two; but the case may be placed in any of the positions heretofore named, since the elastic and weighted diaphragm will have vibrations similar to those of the vibrator in Figs. 6 and 7, and for the same reasons; hence the electromagnet a b will vibrate as in the former instance, and with like results, there being permanent magnets e, as before.

Figure 9:

In Fig. 9 is shown a case A similar to that of Fig. 8, but smaller, since the inclosed mechanism requires less space. The vibrator G consists, chiefly, of the diaphragm h, to which an insulated metallic piece or point, j, is attached. Below this piece j is an insulated metallic plate, k. The piece j and plate k each have one end of the looped-in wires l connected therewith, said wires being parts of the line-wire having a battery-connection; or one of these wires may be a part of the line-wire connected with a battery, while the other wire may be considered as a direct connection of either the piece j or plate k with the ground. The vibrator—that is, the diaphragm and point j—moving as and from like causes as in the other arrangements, the point j will come in contact with and be carried away from the plate k, and hence the electric circuit will be alternately completed and broken.

In Fig. 10 is again shown a case A having rigid top as well as rigid bottom, sides, and ends. The vibrator G consists of a double pointed and insulated metallic piece, m, which is supported by a spring, c, as the armature or soft core is supported in Figs. 6 and 7, and has similar movements from like causes. This piece m makes alternate contact with the two insulated metallic plates n and o. Wires are suitably connected with all three insulated metallic parts, with the line-wire, battery, and ground, if desired, to produce the required effects when the circuit is alternately completed and broken by the vibration of the piece m.

A case A of somewhat different shape is shown in Fig. 11. It may be a cylinder having the sides, top, and bottom rigid. A coil, p, is fixedly secured to the case, and the vibrator G is a permanent magnet, so supported by the spiral springs q and r that it may vibrate up and down in the coil. Currents may thus be generated in the coil according to principles well known, and may be conducted to any place and in the manner desired by wires, parts of which are shown.

Figure 12:
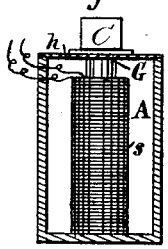

The form of Fig. 12 is somewhat similar to that of Fig. 11, with this exception—namely, that the vibrator G consists of a diaphragm, h, having the straight magnet attached thereto, to vibrate in the coil s, fixed to the case A. The electric results and connections are like to those pertaining to the arrangement shown in Fig. 12.

Figure 13:
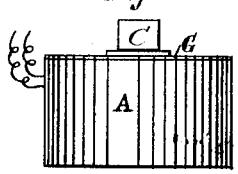
Figure 14:
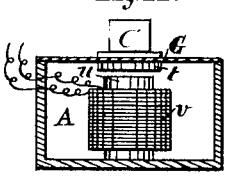
Figure 16:
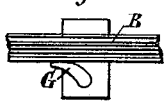

Particular attention is called to the forms shown in Fig. 13, which is an external view, and Fig. 14, which shows a central vertical section, of the case A and the arrangement of the inclosed parts. In this form the device may be likened somewhat to a magneto-telephone. The vibrator G is the diaphragm. Its mass of metal may, however, be increased by a central plate, t. The magnet u is surrounded by a coil, v, the ends of the wire extending, as shown, to make the desired connections. Such an instrument will operate in a manner like to that of a telephone, and if a suitable receiving-instrument—as, for instance, an ordinary telephone—be connected with the wires, rather than simple electric devices for ringing a bell or bells or for moving a visible signal, as especially contemplated with the arrangements herein described, not only may the fact that a train is approaching be indicated, but, in a measure, the character of the train, for no two trains will cause like vibrations in the railway or road bed. While this form of the device in which my vibrator is applied may be likened somewhat to a magneto-telephone, yet it must be borne in mind that the moving force is immensely greater than that for which such telephones are adapted.

It is well to note here that while in all forms of adapting my vibrator the movement is through a distance quite short, yet a mass may be moved ample for all practical purposes on account of the great weight of a locomotive, car, or carriage, and the consequent powerful vibrations caused thereby. Even if the road-bed is of very solid material, or is frozen, the vibrations specified will be found to exist in a great degree. If a receiving-instrument on the telephonic principle is used in connection with the device, as illustrated in Figs. 13 and 14, it should be of much heavier construction than ordinary telephones, so that the sounds may be heard at greater distances. For simply making and breaking circuit, as contemplated by the arrangements of Figs. 9 and 10, when a battery is employed, very light vibrations only will be necessary.

Figure 15:
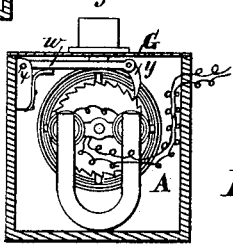
Figure 17:
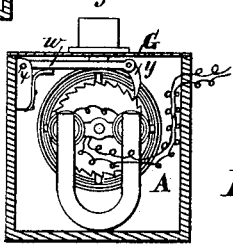

In Fig. 15 I have shown how the vibrator may be employed as a prime mover in mechanism for producing a revolving motion. The vibrator is here in the form of a diaphragm. Against this diaphragm bears a lever, $w$, pivoted at $x$, and bearing a pawl, $y$. This pawl moves a ratchet-wheel, and thus a shaft bearing a balance-wheel and electro-magnet is revolved. The electro-magnet being revolved before the poles of a permanent magnet, currents of electricity are generated which may be conducted and applied by well-known means. In this arrangement I wish to call attention particularly to the fact that the distance of motion may be increased by the use of a lever. A lever may be connected with the vibrator, or the vibrator itself may have the force which causes its vibration applied to it, so that it may be a lever to increase the distance of motion, and this may be done in many ways so simple that it is not necessary to particularize them here.

Of course it is to be understood that when the vibrations are utilized for generating electric currents or impulses the coil shown in the apparatus is in a closed circuit. The ground may form part of the circuit when desired and feasible.

I have spoken of signaling on other roads than railways. The vibrator adapted to be moved by the vibrations of the road-bed might be located in connection with an ordinary carriage-road, so as to indicate the approach of a carriage—that is, be a part of the electrical apparatus for that purpose—operating as and performing the office herein set forth.

Though in the figures of the drawings from Fig. 8 to Fig. 15, inclusive, the vibrator is shown as placed directly under a sleeper, yet it should not be inferred that it is confined to this location. Any of the locations shown in figures from 1 to 5, inclusive, may be adopted, as deemed best, bearing in mind that the vibration of the rail is through a greater distance than that of a sleeper, and that the vibration of the sleeper is greater than that of the road-bed. To prevent the displacement of the case A when it is desirable to keep it in contact with rail or sleeper, it or the diaphragm thereof may be bolted or rigidly secured to the rail or sleeper.

I claim as my invention—

1. The combination, with a roadway, of a magneto-generator and circuit therefor, substantially as set forth, the vibrator, which is a member of said generator, being supported substantially as described, whereby it has vibrations relative to the other members of the generator caused by the vibrating roadway which is vibrated by a passing vehicle.

2. The combination, with a railway, of a magneto-generator and a circuit therefor, substantially as set forth, the vibrator, which is a member of said generator, being supported substantially as described, whereby it has vibrations relative to the other members of the generator caused by some vibrating part of the railway which is vibrated by a passing train.

3. In combination with a roadway, a box or case connected with some vibrating part of said roadway which is vibrated by a passing vehicle, and a vibrator which is an element in an electric signaling apparatus supported in said box or case, substantially as described, whereby it has vibrations relative to said box or case caused by said vibrating part of the roadway acting on said vibrator through the medium of said box or case, or part thereof, substantially as set forth.

4. In combination with a railway, a box or case connected with some vibrating part of said railway which is vibrated by a passing train, and a vibrator which is an element in an electric signaling apparatus supported in said box or case, substantially as described, whereby it has vibrations relative to said box or case caused by said vibrating part of the railway acting on said vibrator through the medium of said box or case, or part thereof, substantially as set forth.

5. In electric signaling apparatus, the combination of a roadway, a magneto-generator and circuit therefor, and an inclosing box or case having an elastic reciprocating side or diaphragm carrying the armature of the generator and placed in contact with some portion of the roadway, substantially as and for the purpose set forth.

6. In electric railway signaling apparatus, the combination of a railway, a magneto-generator and circuit therefor, and an inclosing box or case having an elastic reciprocating side or diaphragm carrying the armature of the generator and placed in contact with some part of the railway, substantially as and for the purpose set forth.

7. The combination of a roadway, a box or case having an elastic reciprocating side or diaphragm and placed in contact with some portion of said roadway, a magneto-generator in said box or case, and circuit-connections for said generator, the moving part of said generator being connected to said reciprocating side or diaphragm, substantially as and for the purpose set forth.

8. The combination of a railway, a box or case having an elastic reciprocating side or diaphragm and placed in contact with some part of said railway, a magneto-generator in said box or case, and circuit-connections for said generator, the moving part of said generator being connected to said reciprocating side or diaphragm, substantially as and for the purpose set forth.

9. The method set forth in electric signaling, which method consists in inducing on a permanently-closed circuit, including an alarm device, electric currents or impulses corresponding to the vibrations of some part of a roadway produced by the passage of a vehicle.

10. The method set forth in electric railway signaling, which method consists in inducing on a permanently-closed circuit, including an alarm device, electric currents or impulses corresponding to the vibration of some part of a railway produced by the passage of a vehicle or train.

11. The combination, substantially as described, of a road-bed in which tremulous vibrations are produced by the passage of a vehicle or a train of vehicles with a mechanical vibratory generator of electricity in a closed signaling-circuit and located in proximity to the road-bed, as set forth.

12. As an improvement in the art of railway signaling, the method of generating signaling-currents, which consists in transmitting the vibrations of some part of the railway caused by the passage of a vehicle or a train of vehicles to a vibratory mechanical generator of electricity, substantially as set forth.

EDWARD DUMMER.

Witnesses:
WM. H. DRURY,
H. E. DRURY.